: US 8,491,175 B2
(45) Date of Patent: Jul. 23, 2013

(12) United States Patent
Wang He

(54) LIGHT GUIDE PLATE WITH MICRO-DOTS

(75) Inventor: Li-Ying Wang He, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/329,155

(22) Filed: Dec. 16, 2011

(65) Prior Publication Data

US 2013/0121028 A1    May 16, 2013

(30) Foreign Application Priority Data

Nov. 14, 2011   (TW) .................................. 100141368

(51) Int. Cl.
*F21V 7/04*   (2006.01)
(52) U.S. Cl.
USPC ........... 362/625; 362/600; 362/615; 362/624; 362/627

(58) Field of Classification Search
USPC .......................... 362/600, 615, 624, 625, 627
See application file for complete search history.

(56) References Cited

U.S. PATENT DOCUMENTS

| | | | |
|---|---|---|---|
| 7,670,041 B2 * | 3/2010 | Tsai | 362/625 |
| 2004/0252482 A1 * | 12/2004 | Tsai | 362/31 |
| 2005/0088838 A1 * | 4/2005 | Tsai | 362/31 |
| 2008/0013338 A1 * | 1/2008 | Huang | 362/606 |

* cited by examiner

*Primary Examiner* — Stephen F Husar
*Assistant Examiner* — Meghan Dunwiddie
(74) *Attorney, Agent, or Firm* — Altis Law Group, Inc.

(57) ABSTRACT

A light guide plate includes an incident surface, an emergent surface substantially perpendicular to the incident surface, a bottom surface opposite to the emergent surface, and a number of micro-dots positioned on the bottom surface. The micro-dots have similar shape and size. A density of the micro-dots gradually increases from a near-end to a far-end of the incident surface.

9 Claims, 1 Drawing Sheet

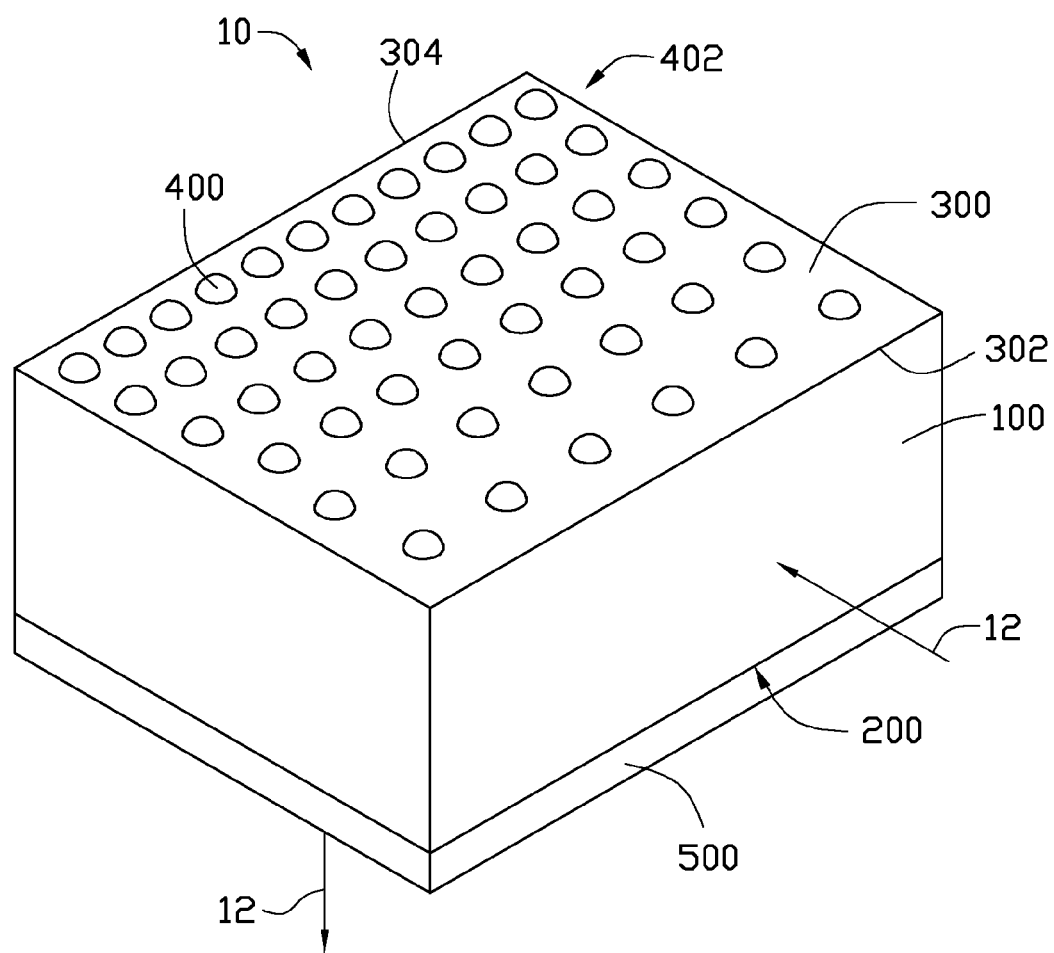

LIGHT GUIDE PLATE WITH MICRO-DOTS

BACKGROUND

1. Technical Field

The present disclosure relates to light guide plates and, particularly, to a light guide plate having micro-dots.

2. Description of Related Art

Light-guide plates are widely used in light sources of image displays and include an incident surface, an emergent surface connected to the incident surface, and a bottom surface opposite to the emergent surface. In use, light rays enter the light guide plate via the incident surface, are reflected by the bottom surface to the emergent surface, and emerge from the light guide plate via the emergent surface. To increase uniformity of the light rays incident on the emergent surface, micro-dots are formed in the bottom surface to disperse the light rays. To further increase the uniformity, a density of the micro-dots decreases from a near-end to a far-end of the incident surface so as to disperse the light rays strongly near the incident surface but weakly far from the incident surface. However, as such, chromatic aberrations of the light rays at the emergent surface change significantly along a direction from the near-end to the far-end of the incident surface and differences of the chromatic aberrations exceed an acceptable range, degrading image quality of the image displays.

Therefore, it is desirable to provide a light guide plate, which can overcome the above-mentioned problems.

BRIEF DESCRIPTION OF THE DRAWING

Many aspects of the present disclosure can be better understood with reference to the following drawing. The components in the drawings are not necessarily drawn to scale, the emphasis instead being placed upon clearly illustrating the principles of the present disclosure.

The FIGURE is an isometric schematic view of a light guide plate, according to an embodiment.

DETAILED DESCRIPTION

Embodiments of the present disclosure will now be described in detail with reference to the drawing.

Referring to the FIGURE, a light guide plate 10, according to an embodiment, includes an incident surface 100, an emergent surface 200 substantially perpendicular to the incident surface 100, and a bottom surface 300 opposite to the emergent surface 200. The bottom surface 300 is configured for reflecting light rays 12 from the incident surface 100 to the emergent surface 200 and forms a number of micro-dots 400. The micro-dots 400 are substantially similar to each other in shape and size. However, a density of the micro-dots 400 gradually increases from a side 302 of the bottom surface 300 adjacent to the incident surface 200 (i.e., a near-end of the incident surface 100) to an opposite side 304 of the bottom surface 300 that is distant from the incident surface 100 (i.e., a far-end of the incident surface 100).

Experimentally it was found that chromatic aberration of the light rays 12 at the emergent surface 200 varies over an acceptable range from the near-end to the far-end of the incident surface 100. That is, differences of the chromatic aberrations are controlled.

In this embodiment, the incident surface 100, the emergent surface 200, and the bottom surface 300 are rectangular, the incident surface 100 is connected between the emergent surface 200 and the bottom surface 300, and the density of the micro-dots 400 gradually increases from the side 302 of the bottom surface 300 connected to the incident surface 200 to the side 304 of the bottom surface 300 opposite to the incident surface 100.

The micro-dots 400 are arranged into a number of lines 402, each of which is straight and extends along a direction that is substantially parallel to the incident surface 100. The number of the micro-dots 400 in each line gradually increases from the near-end to the far-end of the incident surface 100.

The pitch between each two adjacent micro-dots 400 in each line 402 is fixed. The pitch between each two adjacent lines 402, which can be fixed in other embodiment, gradually decreases from the near-end to the far-end of the incident surface 100.

The micro-dots 400 can be bulges or recesses. A ratio of a transverse size (as measured along a direction that is substantially parallel to the bottom surface 300) to a longitudinal size (as measured along a direction that is substantially perpendicular to the bottom surface 300) of each micro-dot 400 is in a range of about 7.8:1 to about 12.9:1. In this embodiment, the ratio is about 10:1.

Experimentally it was also found that the differences of the chromatic aberration can be further controlled by decreasing the transverse size and/or the longitudinal size of each micro-dot 400 (see Tables 1-4). However, for balancing other factors, such as manufacturing efficiency, the transverse size in a range of about 35 um to about 45 um and the longitudinal size is in a range of about 3.5 um to about 4.5 um is used in this embodiment.

TABLE 1

| transverse size (um) | longitudinal size (um) | difference of the chromatic aberrations at a point of the emergent surface 200 adjacent to the incident surface 100 and at a middle part of the emergent surface 200 | difference of the chromatic aberrations at a middle part of the emergent surface 200 and at a point far of the emergent surface 200 from the incident surface 100 |
|---|---|---|---|
| 61 | 5.8 | 0.0026 | 0.0062 |
| 61 | 8 | 0.0026 | 0.0051 |

TABLE 2

| transverse size (um) | longitudinal size (um) | difference of the chromatic aberrations at a point of the emergent surface 200 adjacent to the incident surface 100 and at a middle part of the emergent surface 200 | difference of the chromatic aberrations at a middle part of the emergent surface 200 and at a point of the emergent surface 200 far from the incident surface 100 |
|---|---|---|---|
| 41 | 6.6 | 0.0036 | 0.0072 |
| 41 | 5 | 0.0005 | 0.0034 |

TABLE 3

| transverse size (um) | longitudinal size (um) | difference of the chromatic aberrations at a point of the emergent surface 200 adjacent to the incident surface 100 and at a middle part of the emergent surface 200 | difference of the chromatic aberrations at a middle part of the emergent surface 200 and at a point of the emergents surface 200 far from the incident surface 100 |
|---|---|---|---|
| 61 | 5.8 | 0.0026 | 0.0062 |
| 54 | 5.8 | 0.0017 | 0.0043 |

TABLE 4

| transverse size (um) | longitudinal size (um) | difference of the chromatic aberrations at a point of the emergent surface 200 adjacent to the incident surface 100 and at a middle part of the emergent surface 200 | difference of the chromatic aberrations at a middle part of the emergent surface 200 and at a point of the emergent surface 200 far from the incident surface 100 |
|---|---|---|---|
| 61 | 5 | 0.0026 | 0.0051 |
| 41 | 5 | 0.0005 | 0.0034 |

The light guide plate 10 further includes a diffusing sheet 500 formed on the emergent surface 200 to increase uniformity of the light rays 12 incident on the emergent surface 200.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A light guide plate, comprising:
an incident surface;
an emergent surface substantially perpendicular to the incident surface;
a bottom surface opposite to the emergent surface, the bottom surface comprising a first side adjacent to the incident surface and a second side opposite to the first side and distant from the incident surface; and
a plurality of micro-dots positioned on the bottom surface, the micro-dots having similar shape and size, a density of the micro-dots gradually increasing in a direction from the first side to the second side, wherein a ratio of a transverse size to a longitudinal size of each micro-dot is in a range of about 7.8:1 to about 12.9:1.

2. The light guide plate of claim 1, wherein the incident surface, the emergent surface, and the bottom surface are rectangular, the incident surface connects the emergent surface and the bottom surface.

3. A light guide plate, comprising:
an incident surface;
an emergent surface substantially perpendicular to the incident surface;
a bottom surface opposite to the emergent surface, the bottom surface comprising a first side adjacent to the incident surface and a second side opposite to the first side and distant from the incident surface; and
a plurality of micro-dots positioned on the bottom surface, the micro-dots having similar shape and size, a density of the micro-dots gradually increasing in a direction from the first side to the second side;
wherein the micro-dots are arranged into a number of lines, each of which is straight and extends along a direction that is substantially parallel to the incident surface, the pitch between each two adjacent lines of the micro-dots gradually decreases in the direction from the first side to the second side.

4. The light guide plate of claim 3, wherein the number of the micro-dots in each line gradually increases in the direction from the first side to the second side.

5. The light guide plate of claim 3, wherein the pitch between each two adjacent micro-dots in each line are fixed.

6. The light guide plate of claim 1, wherein the micro-dots are bulges or recesses.

7. The light guide plate of claim 1, wherein a ratio of a transverse size to a longitudinal size of each micro-dot is about 10:1.

8. The light guide plate of claim 1, wherein the transverse size of each micro-dot is in a range of about 35 um to about 45 um, and the longitudinal size of each micro-dot is in a range of about 3.5 um to about 4.5 um.

9. The light guide plate of claim 1, further comprising a diffusing sheet positioned on the emergent surface.

* * * * *